United States Patent [19]

Hunnicutt et al.

[11] Patent Number: 5,000,294

[45] Date of Patent: * Mar. 19, 1991

[54] SELF-ADJUSTING CALIPER

[75] Inventors: Harry A. Hunnicutt, Ann Arbor, Mich.; James A. V. Buckley, Whitefish Bay, Wis.

[73] Assignee: Hayes Industrial Brake, Inc., Mequon, Wis.

[*] Notice: The portion of the term of this patent subsequent to Jun. 19, 2001 has been disclaimed.

[21] Appl. No.: 720,952

[22] Filed: Apr. 8, 1985

[51] Int. Cl.$^5$ ............................................. F16D 65/56
[52] U.S. Cl. ................................. 188/71.9; 188/72.7; 188/196 D; 192/70.25; 192/111 A
[58] Field of Search ................ 188/71.9, 72.7, 196 D, 188/196 BA; 192/70.25, 111 A

[56] References Cited

U.S. PATENT DOCUMENTS

| | | | |
|---|---|---|---|
| 3,321,050 | 5/1967 | Press | 188/71.9 |
| 3,365,031 | 1/1968 | Swift | 188/72.7 X |
| 3,768,602 | 10/1973 | Barnett | 188/71.9 |
| 4,061,208 | 12/1977 | Nishiyama | 188/71.9 |
| 4,180,146 | 12/1979 | Airheart | 188/71.9 X |
| 4,278,152 | 7/1981 | Tosi | 188/71.9 |
| 4,374,551 | 2/1983 | Birkenbach et al. | 188/71.9 |
| 4,399,894 | 7/1983 | Tribe | 188/71.9 |
| 4,454,933 | 6/1984 | Hunnicutt et al. | 188/71.9 |
| 4,491,203 | 1/1985 | Monick | 188/71.9 |

FOREIGN PATENT DOCUMENTS 2090353  7/1982  United Kingdom ............... 188/71.9

Primary Examiner—George E. A. Halvosa
Attorney, Agent, or Firm—Foley & Lardner

[57] ABSTRACT

A self-adjusting, wear-compensating device for a floating caliper disc brake of the type having a pair of brake pads positioned to engage the disc brake rotor, the device including a rotor and a stator mounted in the caliper housing, the rotary motion of the rotor being converted to linear motion in the stator toward one of the brake pads, a threaded shaft is mounted in a threaded bore in the stator and has one end positioned to engage the brake pad and the other end extending into the rotor, and a one-way clutch is mounted on the other end of the shaft and is operatively connected to the rotor to impart rotary movement to the shaft relative to the stator whenever the rotor rotates more than a predetermined amount to advance the shaft an incremental amount, the clutch is protected from overload damage by a star ring mounted on the shaft in a position to allow the clutch to slip on the shaft.

5 Claims, 2 Drawing Sheets

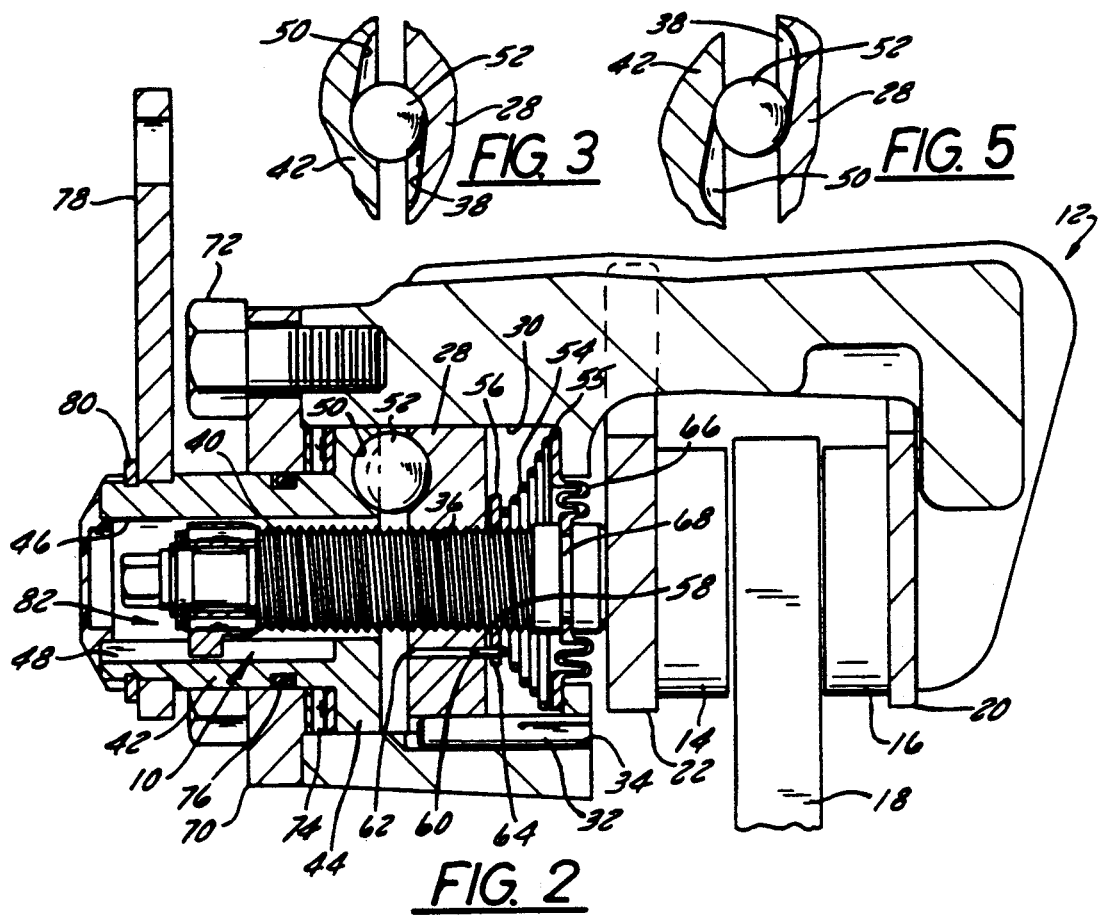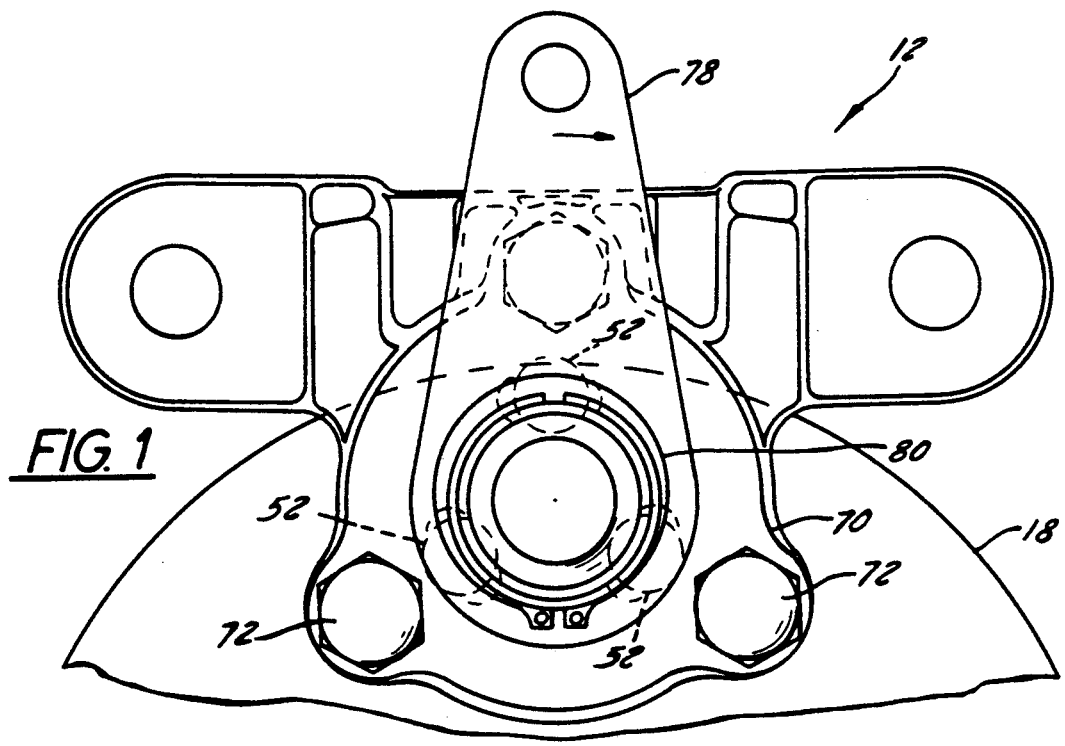

SELF-ADJUSTING CALIPER

BACKGROUND OF THE INVENTION

Adjustment of brake pads in disc brakes to compensate for wear of the brake pads has been a problem recognized in the industry. Various types of adjustment devices have been developed to automatically make this adjustment. These devices generally introduced a predetermined incremental movement of the pads whenever a corresponding amount of wear is sensed by the device. Various mechanisms have been developed to accomplish this movement in the form of ratchet type adjustments as disclosed in U.S. Pat. No. 3,933,170. Most of these devices introduce the adjustment on the return stroke.

SUMMARY OF THE INVENTION

The self-adjusting wear-compensating device according to the present invention provides an infinitely variable self-adjustment of the brake pads to compensate for wear as it occurs. The device is provided with a one-way clutch assembly that introduces an exponential incremental adjustment to the motion of the brake pads each time the brakes are applied. This is accomplished by adding a variable incremental motion to the compensating device each time the device is actuated so that the brake pads are maintained in the same relation to the disc brake rotor whenever the device is in the neutral position. This exponential increase will vary depending on the rate of wear of the brake pads. The compensation device is also provided with an override arrangement for the clutch assembly to prevent damage to the clutch assembly if the shaft is overloaded. The shaft is also spring loaded to prevent free rotation of the shaft when located in the inoperative position.

IN THE DRAWINGS

FIG. 1 is a front view of the floating caliper disc brake showing the self-adjusting wear-compensating device in an intermediate position.

FIG. 2 is a side view in section showing the self-adjusting device in the neutral position.

FIG. 3 is a view showing one of the ball cam arrangements for the self-adjusting device in the neutral position.

FIG. 5 is a view of one of the ball cam arrangements for the self-adjusting device in the operative position.

DESCRIPTION OF THE INVENTION

Figure 6:
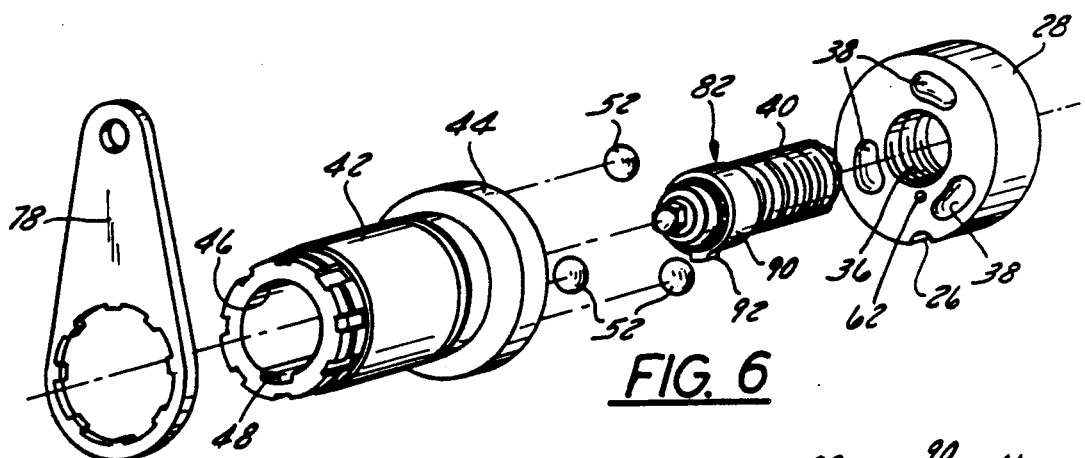
FIG. 6 is an exploded perspective view of the self-adjusting wear-compensating device.

A floating caliper disc brake of the type contemplated by the present invention includes a caliper housing 12 having a pair of brake pads 14, 16 supported in the housing on the opposite sides of a disc brake rotor 18. The brake pad 16 is mounted on the support plate 20 which is fixed with respect to the housing 12. The brake pad 14 is mounted on a support plate 22 which is supported in the housing 12 for movement toward and away from the disc brake rotor 18. The support plate 22 normally floats in the caliper housing when in the neutral position with respect to the rotor 18. In operation, the movable plate 22 is moved toward the rotor 18 to squeeze the rotor between the brake pads 14 and 16. Since the caliper is of the floating type, it will float to allow for an equal distribution of frictional forces on both sides of the rotor 18. Although only one of the brake pads is described as movable herein, it is within the contemplate of this invention to use the self-adjusting device with brake pads being movable with respect to the rotor 18.

In accordance with the present invention, the brake pad is moved between operative and inoperative positions by means of the self-adjusting device 10 which is located within the caliper housing 12. The device generally includes a stator 28 mounted within a bore 30 in the caliper housing 12 for movement toward or away from the brake pad plate 22. The stator 28 is prevented from rotating within the bore 30 by means of a pin 32 positioned within a slot 34 in the housing and aligned with a notch 26 in the periphery of the stator 28. The stator includes a threaded bore 36 and a number of cam grooves 38 on one face of the stator. The motion of the stator 28 is transferred to the plate 22 by means of a threaded shaft or screw 40 which is mounted in the threaded bore 36 in the stator 28.

Figure 4:
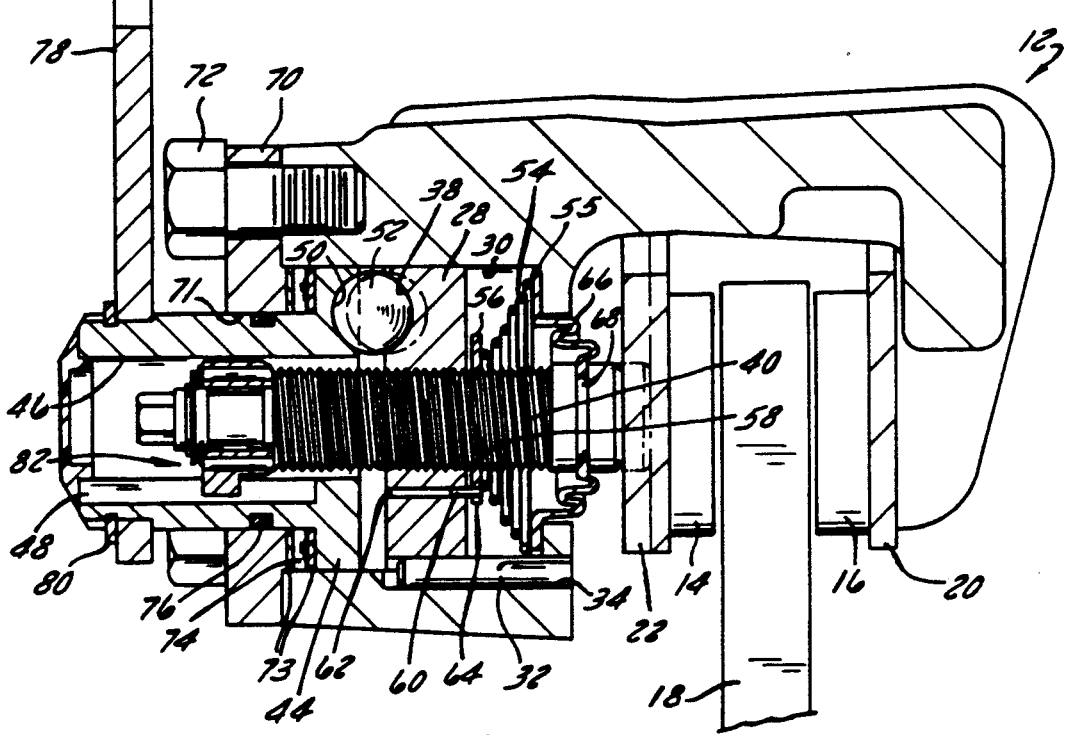
FIG. 4 is a view similar to FIG. 2 showing the self-adjusting device in an operative position.

The stator 28 is moved toward the brake support plate 22 by means of a cylindrical rotor 42 having a radial flange 44 at one end and a central bore 46 having a slot 48 along one side. The rotor 42 is positioned in the bore 30 with the face of flange 44 parallel to and spaced from the face of the stator 28. The face of flange 44 includes a number of cam grooves 50 which are positioned opposite to the cam grooves 38 in the stator 28. The rotary motion of the rotor 44 is converted to axial motion in the stator 22 by means of a number of balls 52 which are positioned in the grooves 38 and 50. Referring to FIG. 3, one of the balls 52 is shown in the neutral position seated in the cam grooves 38 and 50. In FIG. 4, the rotor 44 has been rotated to an operative position with ball 52 rolled to the end of the cam grooves 38 and 50.

The stator 28 is biased to the neutral position by means of a compression spring 54 which is positioned between the stator 28 and the flange 55 at the end of the bore 30. Means are provided for restraining rotary motion of the shaft 40 due to vibration or clutch freeze-up. Such means is in the form of a thrust washer 56 having a threaded bore 58. The thrust washer 56 is mounted on the shaft 40 in a spaced relation to the stator 28 and is prevented from rotating relative to the stator 40 by means of a pin 60 positioned in a hole 62 in the stator in a position to engage a slot 64 in the thrust washer. The force of the spring 54 acting on the thrust washer imposes a frictional force on the threads of the shaft 40 as well as a bias force through the shaft to the stator 28. Dust and dirt are prevented from entering the bore 30 by means of a dust boot 66 which is seated in a groove 68 in the screw 40 and held against the flange 55 at the end of the bore 30 by means of the spring 54.

The rotor is maintained in the bore 30 by means of a cover 70 having a hole 71. The cover 70 is mounted on the housing at the end of the bore 30 and retained thereon by means of bolts 72. Bearing means is provided between the flange 44 of the rotor 42 and the inside surface of the cover 70. Such means is in the form of a pair of thrust washers 73 and a roller thrust bearing 74 positioned between the thrust washers. The rotor 42 is sealed in the hole 71 in the cover by means of an O-ring 76 seated in a groove on the bolt 40. Rotary motion is imparted to the rotor 42 by means of a lever 78 mounted on the end of the rotor and retained thereon by means of a snap ring 80. Rotation of the lever 78 will cause the balls 52 to roll up the cam surfaces in the helix grooves 38 and 50 pushing the stator 28 toward the brake pad support 22.

The amount of rotary motion is determined by the distance the shaft 40 must move to squeeze the pads 14 and 16 against the rotor 18. In the absence of wear, this distance would be constant. However, as the brake pads wear due to frictional engagement with the rotor 18, the amount of motion increases slightly each time the brakes are applied. The screw, therefore, must be advanced an incremental distance each time the cam rollers 52 move beyond the predetermined angular distance of rotation required to seat the pads on the rotor 18.

Figures 7, 8:
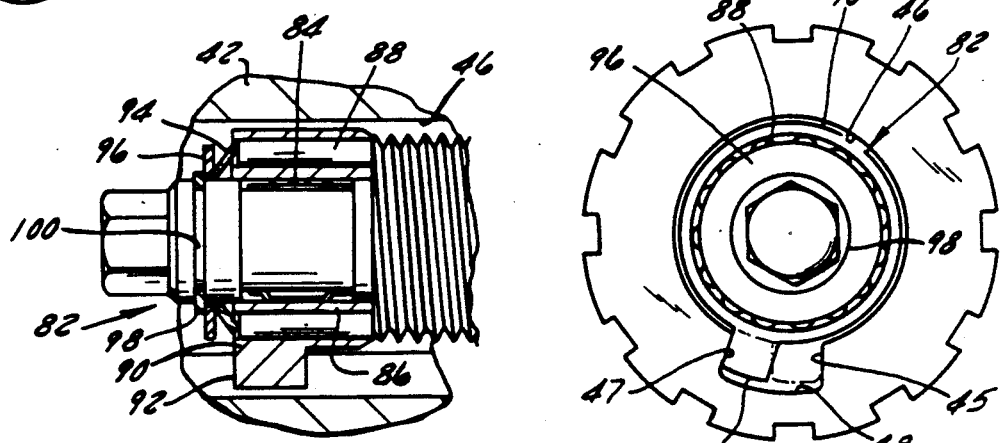
FIG. 7 is an enlarged view showing the one-way clutch for the self-adjusting device.
FIG. 8 is an end view showing the one-way clutch in the rotor bore with the clutch tab aligned in the rotor slot.

This is achieved by means of a one-way clutch assembly 82 provided on the end of the shaft 40. Referring to FIG. 7, the assembly 82 includes a star tolerance ring 84 mounted on the end of the shaft 40, a clutch bushing 86 mounted on the spring 84, a roller clutch 88 mounted on the clutch bushing 86, and a clutch housing 90 mounted on the roller clutch 88. The clutch assembly is protected from overloads by allowing the clutch housing 86 to slide on the shaft. This is accomplished by means of the star tolerance ring 84. Whenever the force applied to the brake pad support 22 by the shaft 40 prevents the shaft from turning the clutch assembly will slide on the star ring. The clutch housing 90 is operatively connected to the rotor by means of a tab 92 which is aligned in the slot 48 in the rotor.

In this regard, and referring to FIG. 8, it will be noted that the slot 48 is substantially wider than the width of the tab 92. The width of the slot 48 corresponds to the operative length of the cam grooves 38 and 50. The width of the tab 92 is less than the width of the slot 48 to allow for lost motion of the rotor before imparting any rotary motion to the clutch. This initial free motion of the rotor is normally sufficient to move the stator far enough to seat the friction pads 14 and 16 on the disc 18. As the pads wear due to the frictional engagement with the rotor 18, the amount of rotary motion required to seat the pads will increase. When this occurs, the rotor will rotate the trailing sidewall 45 of the slot 48 into engagement with the tab 92. The clutch housing 90 will engage the roller clutch 88 causing the shaft 40 to rotate relative to the stator 28. The shaft 40 will thus advance a distance slightly greater than the amount of travel imparted to the stator 28 by the cam action of the rollers 52. This distance is determined by the amount of rotary motion imparted to the screw and the pitch of the screw threads. In a single lead thread the shaft will advance .100 of an inch in each revolution of the shaft. On return motion of the rotor to the inoperative or neutral position, the stator 28 will move toward the rotor due to the bias of the spring 54. The opposite sidewall 47 of the slot 48 will engage the tab 92 to return the clutch housing 90 to the start position without rotating the shaft 40 due to the free rolling condition of the roller clutch 88.

Means are provided on the end of the shaft 40 to assure engagement of the sidewall 47 with the tab 92. Such means, as seen in FIG. 7, is in the form of a spring washer 94 provided on the end of the shaft 40 in a position to frictionally engage the roller clutch 88. The spring washer is retained on the shaft 40 by means of a washer 96 and a snap ring 98 positioned in a groove 100 on the end of the shaft 40. The spring washer 94 provides sufficient frictional force to prevent free motion of the clutch housing 90 with respect to the roller clutch 88 when the lever 78 and rotor 42 are in the neutral position. The lever 78 will always rotate the rotor 42 through a predetermined distance before engaging the tab 92 each time the brake is set. If any over travel occurs, the shaft will rotate with respect to the stator to advance the shaft an exponential incremental amount.

With this arrangement, the amount of motion of the brake pads is adjusted for any wear everytime the rotor rotates far enough to engage the tab 92 on the clutch housing.

The embodiment of the invention in which an exclusive property or privilege is claimed, are defined as follows:

1. A self-adjusting wear-compensating device for a floating caliper brake for a brake disc of the type including
a caliper housing having brake pads mounted in said housing on the opposite sides of the brake disc, at least one of said pads being movable toward the other of said pads to impose a frictional restraint on the brake disc, said compensating device including
a stator mounted in said housing for movement toward and away from said one of said pads,
a threaded shaft supported in said stator for movement into engagement with said one of said brake pads,
a rotor mounted in said housing for rotary motion relative to said stator,
cam means positioned between said rotor and said stator for advancing said stator and said shaft into engagement with said one of said brake pads,
a one way roller clutch mounted on said threaded shaft for rotating said shaft relative to said stator as said stator is advanced toward said brake pad by the motion of said rotor and to rotate freely with respect to said shaft when said shaft is moved away from said brake pad,
lost motion means operatively connecting said clutch to said rotor to allow said rotor to move a predetermined distance relative to said clutch before said clutch rotates said threaded shaft whereby said shaft will be advanced with respect to said stator an exponential incremental amount each time the rotor is rotated beyond said predetermined distance, and
means for frictionally connecting said shaft to said roller clutch to allow said roller clutch to slide with respect to said shaft when the load on the shaft is sufficient to set the brake.

2. The device according to claim 1 wherein said lost motion means comprises
a tab mounted on said clutch and
a slot in said rotor having a width greater than the width of said tab, said tab being aligned in said slot whereby said rotor will rotate with respect to said stator a predetermined distance equal to the difference between the width of the slot and the width of the tab before imparting rotary motion to the clutch housing to rotate the shaft relative to the stator.

3. In a floating caliper for a disc brake, the caliper including, a housing and a pair of brake pads mounted in the housing in a position to engage the sides of a disc brake rotor, the improvement comprising an infinitely variable self-adjusting device including a stator mounted in the housing and having a threaded bore, a threaded shaft mounted in said threaded bore in said stator and having one end operatively positioned to engage one of said pads, means for moving said stator and said shaft toward said one of said pads to impose a frictional restraint on the rotor, said moving means including a one-way roller clutch mounted on said shaft for imparting rotary motion to said threaded shaft relative to said stator after said shaft is moved into engagement with said one of said pads whereby said shaft may be advanced with respect to said stator an incremental distance after said shaft engages said one of said pads, and means for frictionally connecting said roller clutch to said shaft to allow said clutch to rotate with respect to said shaft when the load on said shaft is sufficient to set the brake.

4. The caliper according to claim 3 wherein said moving means includes a rotor mounted in the housing and cam means positioned between said rotor and said stator to convert rotary motion of said rotor to linear motion of said stator.

5. The caliper according to claim 3 wherein said engaging means comprises a tab on said clutch and a slot in said rotor having a width greater than said tab whereby said rotor will rotate a predetermined distance before imparting any rotary motion to said clutch.

* * * * *